(12) United States Patent
Yamamoto (10) Patent No.: US 7,446,571 B2
(45) Date of Patent: Nov. 4, 2008

(54) DATA TRANSMISSION SYSTEM AND CABLE

(75) Inventor: Isao Yamamoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 428 days.

(21) Appl. No.: 11/137,478

(22) Filed: May 26, 2005

(65) Prior Publication Data

US 2005/0219072 A1    Oct. 6, 2005

Related U.S. Application Data

(62) Division of application No. 10/298,543, filed on Nov. 19, 2002, now Pat. No. 7,023,236.

(30) Foreign Application Priority Data

Nov. 28, 2001    (JP)    ............................. 2001-361998

(51) Int. Cl.
*H03K 17/16*    (2006.01)
(52) U.S. Cl. .............................. 326/86; 326/30; 327/108
(58) Field of Classification Search .................... 326/30, 326/86; 710/100, 126
See application file for complete search history.

(56) References Cited

U.S. PATENT DOCUMENTS

| 5,488,705 | A | * | 1/1996 | LaBarbera | .................. 710/305 |
| 5,646,552 | A | | 7/1997 | Ota | |
| 5,864,253 | A | | 1/1999 | Katakura et al. | |
| 6,078,978 | A | | 6/2000 | Suh | |
| 6,265,893 | B1 | | 7/2001 | Bates | |
| 6,323,756 | B1 | * | 11/2001 | Yoshikawa et al. | .......... 307/106 |
| 6,618,774 | B1 | * | 9/2003 | Dickens et al. | ................ 710/64 |
| 6,687,775 | B1 | * | 2/2004 | Bassett | ........................ 710/70 |
| 6,970,010 | B2 | * | 11/2005 | Wilcox et al. | ................. 326/30 |
| 7,072,995 | B1 | * | 7/2006 | Burroughs | ................... 710/16 |
| 7,239,169 | B2 | * | 7/2007 | Isa et al. | ....................... 326/30 |

FOREIGN PATENT DOCUMENTS

| JP | 2-21580 | 1/1990 |
| JP | 02-170376 | 7/1990 |
| JP | 04-264933 | 9/1992 |

* cited by examiner

*Primary Examiner*—Vibol Tan
(74) *Attorney, Agent, or Firm*—Sughrue Mion, PLLC (57) ABSTRACT

A data transmission system capable of transmitting data at high speed without being bound by a counterpart's power supply voltage can be realized. The data transmission system comprises multiple electronic equipment having individual power supplies, a cable for connecting between the multiple electronic equipment so as to transmit signals therebetween, digital data transmitting circuits extending between the multiple electronic equipment and the cable and each having an open drain type output section at the transmitting end, and an input section provided with a pull-up type resistor at the receiving end, wherein the resistor and the output section are moved from the electronic equipment to the connector of the cable so that parasitic capacitance for restricting time constant of waveforms of signals when rising is changed from a capacitance to a small capacitance.

3 Claims, 4 Drawing Sheets

DATA TRANSMISSION SYSTEM AND CABLE

This is a divisional of application Ser. No. 10/298,543 filed Nov. 19, 2002 now U.S. Pat No. 7,023,236; the disclosure of which is incorporated herein by reference.

FIELD OF THE INVENTION

The invention relates to a wired digital data transmission system, particularly to a data transmission system for transmitting and receiving binary signals between multiple electronic equipment each provided with an individual power supply and a cable used therein.

BACKGROUND OF THE INVENTION

Figure 4A:
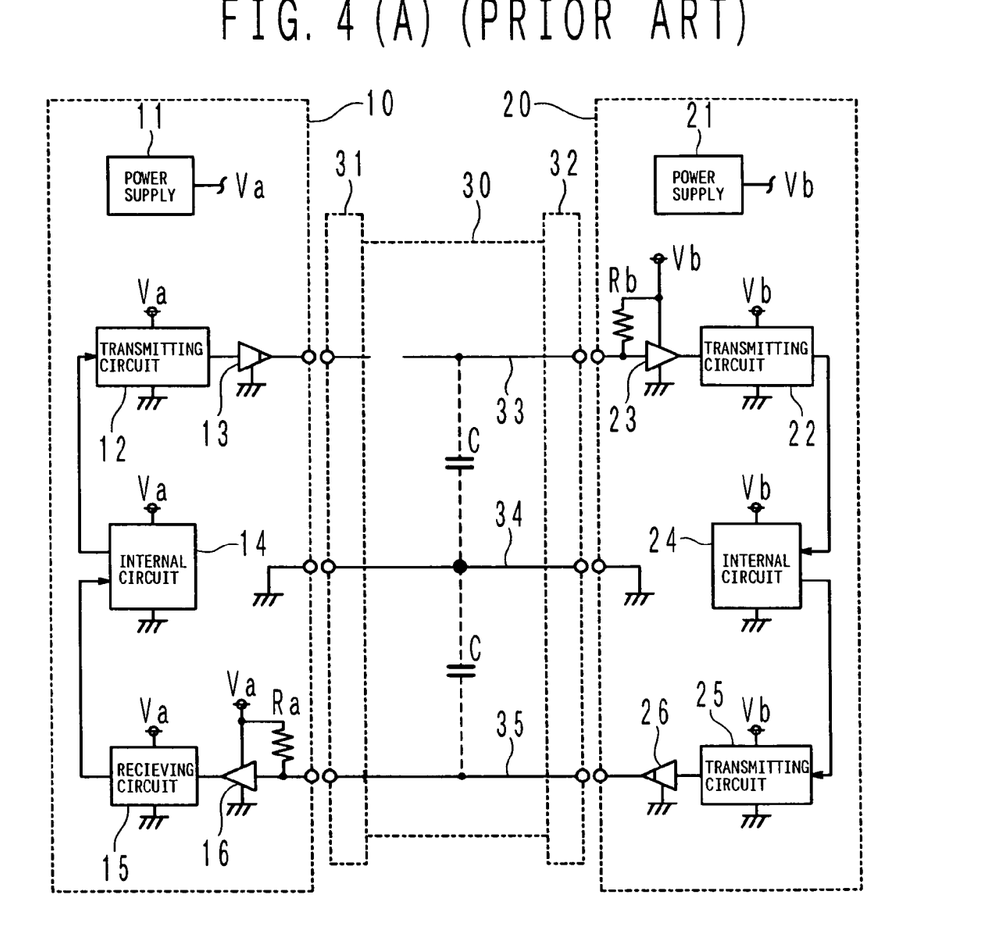
FIG. 4(A) is a circuit diagram.

A conventional data transmission system as illustrated by a circuit diagram in FIG. 4(A) comprises multiple electronic equipment 10, 20 each provided with an individual power supply, and a cable 30 for connecting therebetween. The data transmission system includes two sets of data transmitting circuits each having an open drain type output section at a transmitting end and an input section provided with a pull-up type resistor at a receiving end, and these data transmitting circuits extend between the electronic equipment 10, 20 and the cable 30. A first digital data transmitting circuit is provided for transmitting data from the electronic equipment 10 to the electronic equipment 20 while a second digital data transmitting circuit is provided for transmitting data from the electronic equipment 20 to the electronic equipment 10 in an opposite direction.

The electronic equipment 10 (first electronic equipment) comprises a power supply 11 of an output voltage Va, an internal circuit 14 for effecting various data processing adaptable to intend applications, a transmitting circuit 12 for subjecting transmission data supplied from the internal circuit 14 to a proper coding processing or modulating processing such as a parallel-serial conversion and the like so as to adjust a data format, an open drain type output section 13 (first output section) for binarizing an output signal from the transmitting circuit 12 and transmitting the binarized output signal to the electronic equipment 20 by way of the cable 30, an input section 16 (second input section) for waveform shaping a binary signal supplied from the electronic equipment 20 by way of the cable 30 and inputting thereto, a pull-up resistor Ra (second resistor) which is attached to the input side of the input section 16, and a receiving circuit 15 for subjecting the received data inputted to the input section 16 to a proper decoding processing or demodulating processing such as serial-parallel conversion and the like so as to adjust a data format and supplying it to the internal circuit 14.

The transmitting circuit 12, the internal circuit 14, the receiving circuit 15, the input section 16 are respectively operated under the output voltage Va while the pull-up resistor Ra is connected to a power supply line of the output voltage Va at one end and also connected to an input line of the input section 16 at the other end so as to perform its function utilizing the output voltage Va. On the other hand, the open drain type output section 13 is employed so as to supply a signal without dependence on the output voltage Va of its own electronic equipment 10. That is, the output section 13 is rendered in a ground state in its output when an output value thereof is low while it is rendered in a high impedance state (floating state, high resistive state) in its output when the output value is high.

The electronic equipment 20 (second electronic equipment) that is a communication counterpart of the electronic equipment 10 comprises a power supply 21 of an output voltage Vb, an internal circuit 24 for effecting various data processing adaptable to intend applications, a transmitting circuit 25 for subjecting transmission data supplied from the internal circuit 24 to a proper coding processing or modulating processing such as a parallel-serial conversion and the like so as to adjust a data format, an open drain type output section 26 (second output section) for binarizing an output signal from the transmitting circuit 25 and transmitting the binarized output signal to the electronic equipment 10 by way of the cable 30, an input section 23 (first input section) for waveform shaping a binary signal supplied from the electronic equipment 10 by way of the cable 30 and inputting thereto, a pull-up resistor Rb (first resistor) which is attached to the input side of the input section 23, and a receiving circuit 22 for subjecting the received data inputted to the input section 23 to a proper decoding processing or demodulating processing such as serial-parallel conversion and the like so as to adjust a data format and supplying it to the internal circuit 24.

The input section 23, the receiving circuit 22, the internal circuit 14 and the transmitting circuit 25 are respectively operated under the output voltage Vb while the pull-up resistor Rb is connected to a power supply line of the output voltage Vb at one end and also connected to an input line of the input section 23 at the other end so as to perform its function utilizing the output voltage Vb. On the other hand, an open drain type output section 26 is employed so as to supply a signal without dependence on the output voltage Vb of its own electronic equipment 20. That is, the output section 26 is rendered in ground state in its output when an output value thereof is low while it is rendered in a high impedance state (floating state, high resistive state) in its output when the output value is high.

The cable 30 has a connector 31 provided at its one end at the electronic equipment 10 side and another connector 32 provided at its other end at the electronic equipment 20 side, and also it has a long intermediate portion which is flexible and soft so that a physical connection between the electronic equipment 10 and electronic equipment 20 can be dynamically and simply established in compliance with the necessity of communication. Multiple signal transmission lines 33, 35 and a ground line 34 which are respectively made of copper wire and the like, and insulatively coated, and built in the cable 30. The lines 33, 34, 35 are respectively connected to corresponding contact terminals of the connector 31 at each one end and also connected to corresponding contact terminals of the connector 32 at each other end. The ground line 34 may be connected to a shield or may act as a shield.

When the electronic equipment 10 and the electronic equipment 20 are connected to each other by the cable 30, the output line of the output section 13, the signal transmission line 33 and the input line of the input section 23 are connected to one another, and the ground line of the electronic equipment 10, the line 34 and the ground line of the electronic equipment 20 are connected to one another while the output line of the output section 26, the line 35 and the input line of the input section 16 are connected to one another. That is, a first digital data transmitting circuit for transmitting a binary signal from the electronic equipment 10 to the electronic equipment 20 is formed of the output section 13, the line 33 and the input section 23, while a second digital data transmitting circuit for transmitting a binary signal from the electronic equipment 20 to the electronic equipment 10 in an opposite direction is formed of the output section 26, the line 35 and the input section 16.

The connector 31 is mounted onto the electronic equipment 10 and the connector 32 is mounted onto the electronic equipment 20, and the electronic equipment 10 and the electronic equipment 20 are connected to each other by the cable 30 so as to transmit data in order to transmit and receive data between the electronic equipment 10, 20. In this state, the transmission of data from the electronic equipment 10 to the electronic equipment 20 is effected by the first digital data transmitting circuit (output section 13→line 33→input section 23), while the transmission of data from the electronic equipment 20 to the electronic equipment 10 is effected by the second digital data transmitting circuit (output section 26→line 35→input section 16).

More in detail, an output state of the output section 13 (or 26) is changed between a ground state and a high impedance state as data value to be transmitted is low or high or ever changed so that the line 33 (or 35) is rendered in the ground state when a low data value is outputted. Such a ground state is inputted to the input section 23 (or 16) so that the low data value is transmitted. On the other hand, when a high data value is outputted, the signal transmission line 33 (or 35) is separated from the ground and is rendered in an output voltage Vb (or Va) application state by way of the pull-up resistor Rb (or Ra) and such a state is inputted to the input section 23 (or 16) so that the high data value is transmitted.

According to the conventional data transmission system, since the open drain type output sections 13, 26 are employed at the transmitting end while the input sections 23, 16 provided with the pull-up resistor Rb, Ra are employed at the receiving end, even if the electronic equipment 10, 20 are provided with individual power supplies 11, 21 and operate by their own power supply voltages Va, Vb, they can be connected to each other so as to transmit data by the cable 30 without being bound by the output voltage Va, Vb of the communication counterpart.

Although line capacitance is intensively illustrated on the lines 33, 35 of the cable 30, a capacitance C which distributes between the ground line 34 and a shield or other coating line or the like is parasitic on the lines 33, 35. The capacitance C has a property to increase substantially in proportion to the lengths of the lines 33, 35, and it is generally considerably larger than the capacitance which is parasitic on each circuit inside equipment. When the signals on the lines 33, 35 are changed from a low state to a high state, they slow down by time constant (resistance Rb×capacitance C), (resistance Ra×capacitance C), in accordance with the combination of the capacitance C, resistors Rb, Ra at rising of the signals.

Figure 4B:
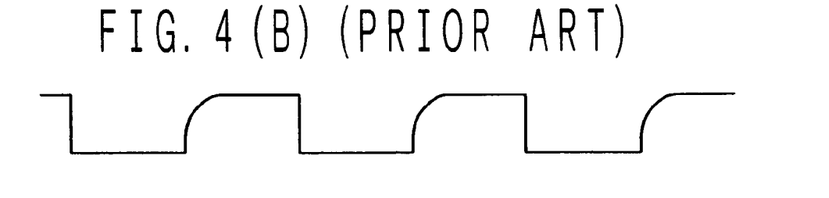
FIG. 4(B) shows an example of a waveform at low transmission rate.

Accordingly, if the data transmission rate is suitable, it is possible to obtain a signal waveform which clearly shows a binary state (see waveform example at the time of low transmission rate shown in FIG. 4B). If the data transmission rate is increased from the foregoing rate, the signal waveform is collapsed, particularly a high state is not made clear (see the waveform example at the time of high transmission rate shown in FIG. 4C) so that the data is not transmitted accurately, causing a problem that it is difficult to speed up data transmission or increase data transmission rate.

Although various standards and the like capable transmitting data at high speed are proposed and in practical use, the restriction imposed on a cable and a transmitting circuit become severe as the data transmission is speeded up, a driving voltage and other bindings are imposed on a driving condition of the signal transmission line.

Under the circumstances, at present if data is transmitted without being bound by a counterpart's power supply voltage, a transmission rate is restricted, while if data is transmitted by increasing the transmission rate, the data transmission is bound by the counterpart's power supply voltage.

It becomes a technical problem to increase the transmission rate while following an open drain type transmission system adaptable for a different power supply so as to meet both advantages, namely, not to be restricted in transmission rate and not to be bound by the counterpart's power supply voltage.

SUMMARY OF THE INVENTION

The invention has been made to solve the problem of the conventional data transmission system, and it is an object of the invention to realize a data transmission system capable of transmitting data at high speed without being bound by a counterpart's power supply voltage.

It is another object of the invention to realize a cable for data transmission which is suitable for the data transmission system.

Configurations, operations, and effects of first and second solving means invented for solving the problem of the conventional data transmission system are described hereinafter.

First Solving Means:

The data transmission system of the first solving means comprises, multiple electronic equipment having individual power supplies, a cable for connecting the electronic equipment so as to transmit signals therebetween, and digital data transmitting circuits extending between the electronic equipment and the cable and having open drain type output sections at transmitting side and input sections provided with pull-up type resistors at receiving ends, wherein either or both of the resistors and output sections are moved to the cable.

Further, the cable for data transmission which is suitable for the data transmission system incorporates therein, a first signal transmission line having both ends extending to both ends of the cable, a push-pull type first driving circuit which is put in the first signal transmission line and connected thereto, a power supply line which is extending from a power terminal of the first driving circuit to the end of the cable at the output side of the first driving circuit, and a pull-up type first resistor which is connected to the power supply line at one end and also connected to the input side of the first driving circuit of the first signal transmission line at the other end.

Alternatively, the cable further comprises, a second signal transmission line having both ends extending to both ends of the cable, and an open drain type second driving circuit which is put in and connected to the second signal transmission line, namely, a moved second output section.

According to the data transmission system of the first solving means, the pull-up type resistor or the open drain type output section is moved to the cable so that the distance therebetween is shortened in length, thereby shortening the length of the part, which is charged and the like by way of the pull-up type resistor, of the signal transmission line inside the cable.

As a result, since parasitic capacitance of the part which is charged and the like becomes small, time constant which restricted the rising of a signal becomes small if the resistance value is the same. Accordingly, the change of a signal waveform on the transmission line is made abruptly in a short time, so that the signal waveform is hardly collapsed even if the data transmission rate is increased, thereby maintaining clear state.

Accordingly, the invention can realize the data transmission system capable of transmitting data at high speed without being bound by the counterpart's power supply voltage.

Second Solving Means:

The data transmission system of the second solving means comprises, first and second electronic equipment having individual power supplies, a cable for connecting between the first and second electronic equipment so as to transmit signals therebetween and having a connector at one end of at least the first electronic equipment side irrespective of the presence of connector at one end of the second electronic equipment side, a first digital data transmitting circuit extending between the first electronic equipment, the cable and the second electronic equipment and having an open drain type first output section at the first electronic equipment side, and a first input section provided with a pull-up type first resistor at the second electronic equipment side, and a second digital data transmitting circuit extending between the first electronic equipment, the cable and the second electronic equipment, and having an open drain type second output section at the second electronic equipment side, and a second input section provided with a pull-up type second resistor at the first electronic equipment side, wherein the first resistor and the second output section are moved from the second electronic equipment to the connector.

Further, the cable for data transmission which is suitable for the data transmission system incorporates therein, a first signal transmission line and a second signal transmission line having a connector provided at least one end of the cable, and both ends thereof extending to both ends of the cable, the cable further comprises a push-pull type first driving circuit which is put in the first signal transmission line within the connector and connected to a line, part of the first signal transmission line extending to the end of the cable at the connector side at its input side (i.e., input terminal or input line of the first driving circuit) and also connected to a line, part of the first signal transmission line opposite to the line, part of the first signal transmission line at its output side (i.e., output terminal or output line of the first driving circuit), a power supply line extending from a power terminal of the first driving circuit to the output side of the first driving circuit, i.e., to the end of the cable opposite thereto, a pull-up type first resistor connected to the power supply line at one end, and also connected to an input side of the first driving circuit of the first signal transmission line at the other end, an open drain type second driving circuit which is put in the second signal transmission line, and connected to a line, part of the second signal transmission line extending to the end of cable at the connector side of the second signal transmission line at its output side (i.e., output terminal or output line of the second driving circuit), and also connected to a line, part of the second signal transmission line opposite to the line, part of the second signal transmission line at its input side (i.e., input terminal or input line of the second driving circuit).

According to the cable for the data transmission system of the second solving means, data is transmitted from the first electronic equipment to the second electronic equipment by the first digital data transmitting circuit by way of the cable while data transmitted from the second electronic equipment to the first electronic equipment by the second digital data transmitting circuit by way of the cable so that two-way communication is effected. Further, according to both the first and second digital data transmitting circuit, a combination of the open drain type output section and the pull-up type resistor is kept therein but the installing positions thereof are moved to the cable so as to render parasitic capacitance small. Further, the part where the open drain type output section and the pull-up type resistor are moved to the connector in the cable which is the closest to the first electronic equipment so that the parasitic capacitance becomes the smallest irrespective of the length of the cable. Still further, the first resistor and the second output section are moved to the cable, which relates to the second electronic equipment and the connector but not relates to the first electronic equipment.

As a result, the data transmission system of the invention can be simply built in the first electronic equipment which has been conventionally used by attaching the connector to or detaching the connector from the the cable, and further the operation and the effect of the invention are immediately achieved by merely increasing the operation speed of the transmitting and receiving sections. This effect is achieved more effectively.

Accordingly, the invention can realize the data transmission system capable of transmitting data at much higher speed without being bound by the counterpart's power supply voltage which is familiar with existing electronic equipment.

BRIEF DESCRIPTION OF THE DRAWINGS

FIG. 1(A) to (C) show a data transmission system according to a first embodiment of the invention wherein FIG. 1(A) is a circuit diagram, FIG. 1(B) shows an example of a waveform at low transmission rate, and FIG. 1 (C) shows an example of a waveform at high transmission rate;

FIG. 4(A) to (C) show a conventional data transmission system wherein

PREFERRED EMBODIMENT OF THE INVENTION

First Embodiment

A concrete configuration of the data transmission system according to the first embodiment of the invention is described with reference to FIGS. 1(A) to 1(C), which are compared with FIGS. 4(A) to 4(C) of the conventional data transmission system, in which FIG. 1(A) is a circuit diagram. The data transmission system shown in FIG. 1(A) is different from that shown in FIG. 4(A) in respect of an electronic equipment 40 (second electronic equipment) formed by partially improving the electronic equipment 20 shown in FIG. 4(A), and a cable 50 formed by partially improving the cable 30 shown in FIG. 4(A). The electronic equipment 10 shown in FIG. 1(A) is the same as that shown in FIG. 4(A).

More in detail, the pull-up type resistor Rb (first resistor) provided in the electronic equipment 20 of the conventional data transmission system and the open drain type output section 26 (second output section, second driving circuit) provided in the same electronic equipment 20 are respectively moved to a connector 51 of the cable 50.

The cable 50 has the connector 51 instead of the connector 31 in FIG. 4(A) at the electronic equipment 10 side, of which a push-pull type buffer 53 (first driving circuit) is put in a line 33 (first signal transmission line). An input terminal of the buffer 53 is connected to a short line of the line 33, a part of the line 33 extending to the end of the connector 51 (i.e., a part for receiving an output of an output section 13) while an output terminal of the buffer 53 is connected to a long line of the line 33, a part of the line 33 opposite to the short line (i.e., a part extending to the connector 32 by way of an intermediate part of the cable 50 of the line 33). A ground terminal of the buffer 53 is connected to a line 34 within the connector 51, and a power supply terminal (power supply and reception section) of the buffer 53 is connected to a vacant line contained in the cable 50 or a line 52 (power supply line) which is assigned thereto by newly adding.

The line 52 extends in parallel with the line 33 in the cable 50 and reaches the connector 32 (end of the cable at the output side), and it is connected to a vacant terminal of the connector 32 or to a contact terminal added to the connector 32.

The pull-up type resistor Rb is connected to the line 52 at one end within the connector 51 and is connected to a short part corresponding to the input side of the buffer 53 of the line 33 at the other end.

Although the output section 26 is put in a line 35 (second signal transmission line) within the connector 51, it is connected to the buffer 53 in an opposite direction. That is, an output terminal of the output section 26 is connected to a short line of the line 35, a part of the line 35 extending to the end of the connector 51 side of the line 35 (i.e., a part extending to an input section 16) while an input terminal of the output section 26 is connected to a long line of the line 35, a part of the line 35 at the opposite side (i.e., a part extending to the connector 32 of the line 35 by way of the intermediate part of the cable 50). Although a ground terminal of the output section 26 is connected to the line 34 within the connector 51, the output section 26 is not connected to a power supply line and the like because it is an open drain type which does not require the supply and reception of a power supply.

The electronic equipment 40 is configured such that the pull-up type resistor Rb is moved to the connector 51 of the cable 50 and displaced from the electronic equipment 40 regarding the first digital data transmitting circuit (output section 13→line 33→input section 23), and the line which is divided from the power supply line of a voltage Vb is wired to reach an a counterpart's connector of the connector 32 corresponding to the line 52 extending from the pull-up type resistor Rb within the cable 50 to reach the connector 32, wherein when the connector 32 is installed on the electronic equipment 40, the line 52 and the power supply line of the voltage Vb are rendered conductive.

The electronic equipment 40 in the second digital transmitting circuit (output section 26→line 35→input section 16) has a push-pull type buffer 41 (alternative driving circuit) provided on a part where the output section 26 was provided before it was moved to the connector 51 (i.e., position corresponding to the output section 26 of the electronic equipment 20 before it was improved) corresponding to a case where the open drain type output section 26 is moved to the connector 51 of the cable 50 and displaced from the electronic equipment 40. The buffer 41 receives an output of a transmitting circuit 25 in the same manner as the previous output section 26, and outputs an output to the line 35 by way of the connector 32 which however operates under a power supply voltage Vb, which is different from the output section 26. That is, the pull-up type buffer 41 renders an output in a ground state in the same manner as the push-pull type buffer 53 when the output value is low while it renders the output in a power supply voltage state when the output value is high wherein electric current flows with low resistance in any state. If the transmitting circuit 25 is formed of a push-pull type and has a sufficient power, the pull-up type buffer 41 may be not provided so as to short circuit the signal line.

Figure 1:
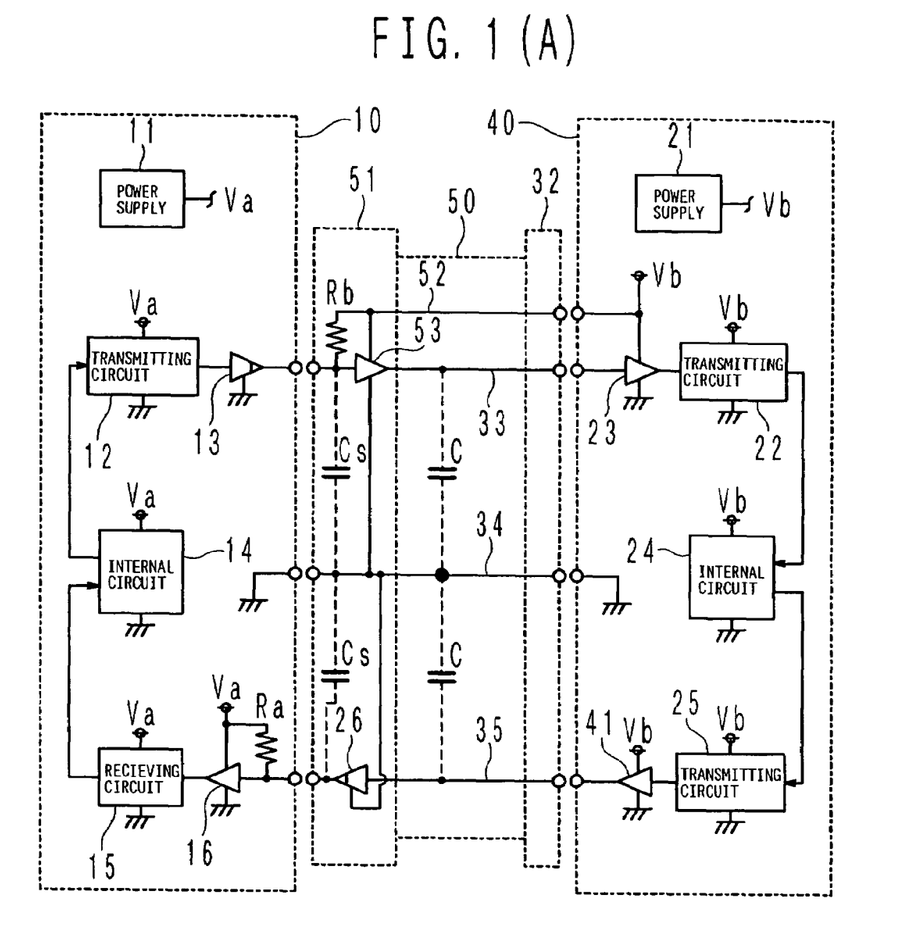
Figure 4C:
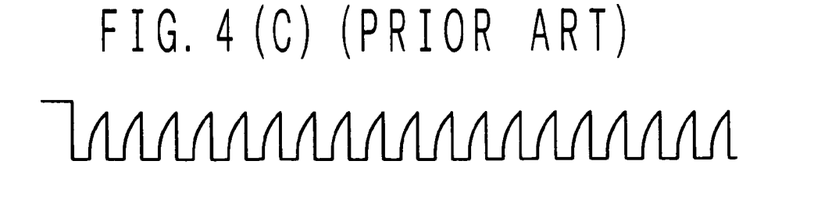
FIG. 4(C) shows an example of a waveform at high transmission rate.

A manner of use and operation of the data transmission system of the first embodiment is described more in detail with reference to FIGS. 1(B) and 1(C) wherein FIG. 1(B) shows an example of a waveform at low transmission rate, and FIG. 1 (C) shows an example of a waveform at high transmission rate which are respectively compared with FIG. 4(B) and 4(C).

Although portable equipment such as a portable telephone is exemplified as a typical example of the electronic equipment 10, a fixedly used electronic equipment may be used. Although a personal computer, a portable information terminal, a mail terminal, a browser board and the like are exemplified an a typical example of the electronic equipment 20, they are not limited to such an electronic equipment. Although a two-way serial communication in which a UART (Universal Asynchronous Receiver Transmitter) is built and which is capable of shifting and changing a band rate is exemplified as a typical example of the data transmission system, the data transmission system is not always such two-way serial communication.

In any case, when the electronic equipment 10 and electronic equipment 40 are connected to each other by the cable 50, more in detail, when the connector 51 is mounted onto the electronic equipment 10 while the connector 32 is mounted on the electronic equipment 40, the output line of the output section 13, a short part of the divided line 33, the buffer 53, a long part of the divided line 33 and the input line of the input section 23 are connected to one another so as to establish the first digital data transmitting circuit, which is rendered in a state where the binary signal can be transmitted from the electronic equipment 10 to the electronic equipment 40. At the same time, the output line of the buffer 41, a long part of the divided line 35, the output section 26, a short part of the divided line 35 and the input line of the input section 16 are connected to one another so as to establish the second digital data transmitting circuit, which is rendered in a state where the binary signal can be transmitted from the electronic equipment 40 to the electronic equipment 10.

When data is transmitted and received between the electronic equipment 10 and electronic equipment 40 which are connected to each other so as to transmit data, the output state of the output section 13 is changed between a ground state and a high impedance state in the first digital data transmitting circuit (output section 13→line 33→buffer 53→line 33→input section 23) as the data value to be transmitted is low or high, or ever changed, so that the short line 33 is rendered in a ground state when low data value is outputted, and the same ground state is inputted to the buffer 53 so that the long line 33 to which the data value is outputted is also rendered in the ground state and also the same state is inputted to the input section 23 so as to transmit the low data value. On the other hand, when high data value is outputted, the short line 33 is separated from the ground and rendered in the voltage Vb application state by way of the pull-up type resistor Rb, while when the same state is inputted to the buffer 53, the long line 33 to which the data value is outputted is rendered conductive to the line 52 with low resistance by way of the buffer 53, and such an active driving establishes the voltage Vb application state, and further the same state is inputted to the input section 23 so as to transmit high data value.

The output state of the buffer 41 is changed between a ground state and a voltage Vb application state in the second digital data transmitting circuit (buffer 41→line 35→output section 26→line 35→input section 16) as the data value to be transmitted is low or high, or ever changed, so that the long line 35 is rendered in a ground state when low data value is outputted, and the same ground state is inputted to the output section 26 so that the short line 35 to which data value is outputted is also rendered in the ground state and also the same state is inputted to the input section 16 so that the low data value is transmitted to the input section 16. On the other hand, when the high data value is outputted, the long line 35 is rendered in the voltage Vb application state, and this state is inputted to the output section 26 so that the short line 35 to which data value is outputted is separated from the ground and is rendered in the voltage Va application state by way of the pull-up type resistor Ra, and the same state is inputted to the input section 16 so that high data value is outputted.

Although the buffer 53 or the buffer 41 is put or added also in this case, the transmission is effected by the open drain type output sections 13, 26 and the reception is effected by the input sections 23, 16 to which pull-up type resistors Rb, Ra are directly or indirectly attached. Accordingly, even if the electronic equipment 10, 40 is provided with individual power supplies 11, 21 so that they can be operable by their own power supply voltages Va, Vb, there keeps an advantage that they can be connected by the cable 50 so as to transmit data therebetween without being bound by the communication counterpart's power supply voltages Va, Vb.

Further, the line 33 and the line 35 of the cable 50 are divided by the buffer 53 and output section 26 within the connector 51 while both the lines 33, 35 are driven by the combination of the open drain type output sections 13, 26 and pull-up type resistors Rb, Ra at each short part, and driven by the push-pull type buffers 53, 41 at each long part. The distributed capacitance C is parasitic (although only the line capacitance is intensively illustrated) between each long line which occupies most parts of the lines 33, 35 and the line 34, shield, other coated material and the like in the same manner as the conventional data transmission system. On the other hand, a small capacitance Cs is parasitic (although only the line capacitance is intensively illustrated) between each short line of the lines 33, 35 located adjacent to the electronic equipment 10 side and the line 34, shield, other coated material and the like. The capacitance Cs at the short part is much smaller than the capacitance C at the long part without dependency on the length of the cable 50.

When signals on the lines 33, 34, and 35 are changed from a low state to a high state, the waveforms of the signals when rising are determined by the combination of the small capacitance Cs and the resistors Rb, Ra but not determined by the large capacitance C. More in detail, the waveforms of the signals are restricted by a time constants (Rb×Cs), (Ra×Cs).

Accordingly, it is needless to say that the waveforms of the signals in a clear binary state (high and low data values are clear) can be obtained within the same data transmission rate as made conventionally (see examples of waveforms at the low transmission rate as shown in FIG. 1(B)), and even if the data transmission rate is increased, waveforms of the signals are hardly collapsed and the waveforms of the signals in a clear binary state can be obtained, so that the data can be transmitted accurately even if it is speeded up (see examples of waveforms at the high transmission rate as shown in FIG. 1(C)).

Accordingly, data can be transmitted at higher transmission rate than the conventional rate. It is not generally told because transmission rate is changed depending on the length of the cable and the like, but the upper limit of the data transmission rate is improved to an extent of about several MHz whereupon the upper limit data transmission rate has been conventionally about several hundred kHz. If the electronic equipment 10 is configured such that the data transmission rate can be changed by operating a menu or data transmission rate can be automatically changed during the communication while the communication is effected at a given low transmission rate at first, the invention can be directly applied to the conventional existent electronic equipment 10.

Second Embodiment

Figure 2A:
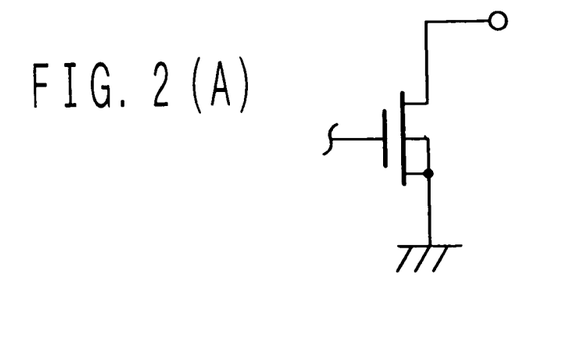
FIGS. 2(A), 2(B), 2(C) show a data transmission system in detail according to a second embodiment of the invention, respectively showing an open drain type circuit.
Figure 2B:
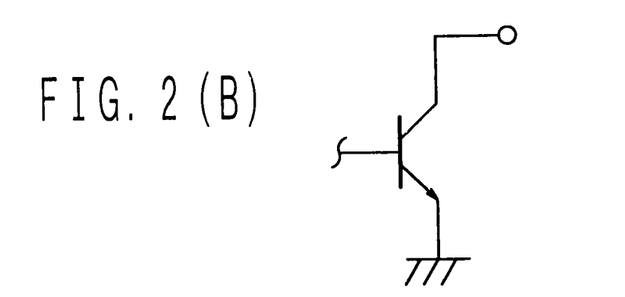
Figure 2C:
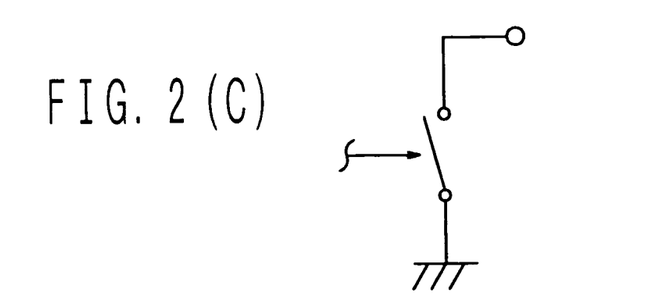

FIGS. 2(A), (B), (C) show open drain type output sections/driving circuits in detail. FIG. 2(A) shows an open drain type output section/driving circuit using a MOS transistor, and FIG. 2(B) shows the output section/driving circuit using an NPN transistor, and also FIG. 2(C) shows the output section/driving circuit using a switch. Even if the output section/driving circuit uses other devices, they correspond to an open drain type output section/driving circuit provided that an output state of an element or circuit is changed between a short circuit state/low resistance conductive state relative to a reference potential such as a ground and the like and a high impedance state.

Third Embodiment

Figure 3A:
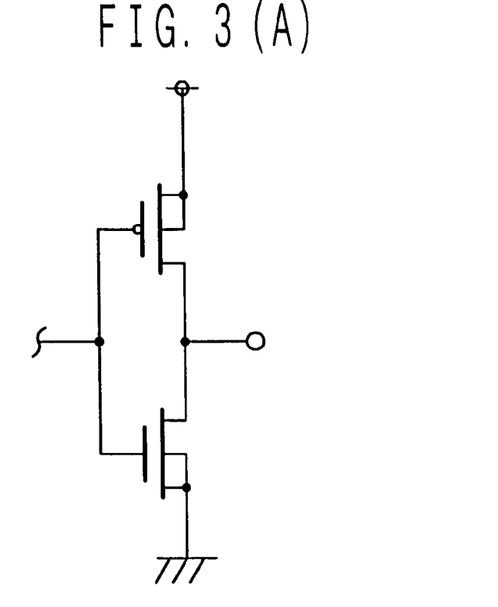
FIGS. 3(A), 3(B), 3(C) show a data transmission system in detail according to a third embodiment of the invention, respectively showing a push-pull type circuit.
Figure 3B:
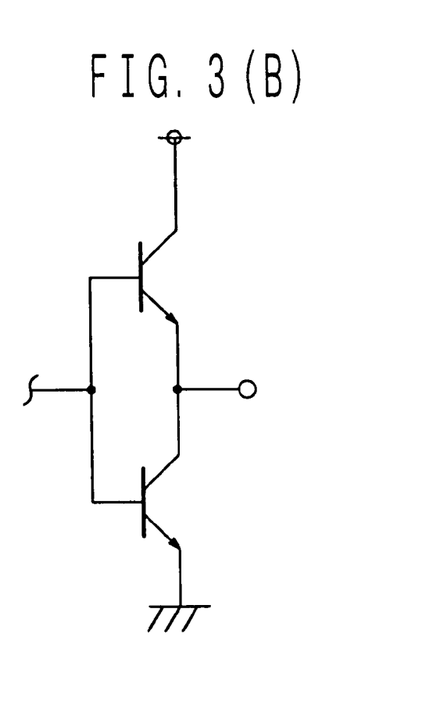
Figure 3C:
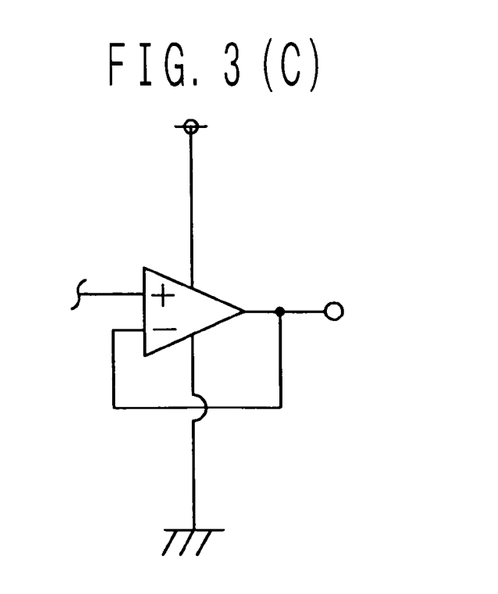

FIGS. 3(A), (B), (C) show push-pull type driving circuits in detail. FIG. 3(A) shows a driving circuit using a C-MOS transistor, and FIG. 3(B) shows a driving circuit using a totem pole bipolar transistor pairs, and also FIG. 3(C) shows a driving circuit using an voltage follow type transistor. Even if the driving circuit uses other devices, they correspond to a push-pull type driving circuit provided that the output state of an element or circuit is changed between a short circuit state/low resistance conductive state relative to a reference potential such as a ground and the like and a short circuit state/low resistance conductive state relative to a reference potential such as a power supply voltage and the like.

Other Embodiments

The pull-up type resistors Ra, Rb are not limited to be formed of a single resistor element and they may be formed of a combination of multiple elements or formed of a resistor network.

Although not shown in drawings, an input protective register, a protective diode, level conversion means, hysteresis property may be added to the input sections 16, 23.

The power supplies 11, 21 may be formed of cells or not formed of cells. If the power supplies 11, 21 are individually provided, the power supply voltages Va, Vb may be the same or not the same, either of which may be higher than the other.

As is evident from the foregoing description, the data transmission system and the cable of the first aspect of the invention has an advantageous effect that the data transmission system can be realized wherein the installing positions of the open drain type output section and the pull-up type resistor are moved to the cable while the combination thereof is kept, thereby rendering a parasitic capacitance small so that data can be transmitted at high speed without being bound by the counterpart's power supply voltage.

The data transmission system and the cable of the second aspect of the invention has an advantageous effect that the data transmission system can be realized wherein the data transmission system can be familiar with existing electronic equipment by limiting the improved section of the two-way transmitting circuit to one side of the connector so that data can be transmitted at higher speed without being bound by the counterpart's power supply voltage.

What is claimed is:

1. A data transmission system comprising:
a first electronic equipment connected to a first power supply and a second electronic equipment connected to a second power supply;
a cable for connecting the first and second electronic equipment so as to transmit signals therebetween; and a digital data transmitting circuit having an open drain type output section provided on the first electronic equipment, an input section provided on the second electronic equipment and connected to an internal circuit provided on the second electronic equipment, and a signal transmission line provided on the cable for connecting between the output section and the input section;

wherein a pull-up type resistor and a driving circuit are provided on the signal transmission line, between both ends thereof, at a position closer to the output section than to the input section; and an output signal from the output section is inputted to the driving circuit by way of the signal transmission line, and outputted from the driving circuit, and thereafter inputted to the input section by way of the signal transmission line.

2. A data transmission system according to claim 1,
wherein the output section is connected to the first power supply; and
the pull-up type resistor, the driving circuit, the input section and the internal circuit are connected to the second power supply.

3. A data transmission system according to claim 1, wherein the driving circuit is a push-pull type.

* * * * *